US011077449B2

(12) United States Patent
Manzanares Mercero et al.

(10) Patent No.: US 11,077,449 B2
(45) Date of Patent: Aug. 3, 2021

(54) MOBILE SHREDDER FOR METAL MATERIALS WITH IMPROVED SAFETY FEATURES

(71) Applicant: Talleres ZB, S.A., Renteria (ES)

(72) Inventors: Adolfo Manzanares Mercero, San Sebastian (ES); Mikel Macías Martín, Donostia (ES); Ángel María Montero Nieto, Hernani (ES)

(73) Assignee: Talleres ZB, S.A., Renteria (ES)

( * ) Notice: Subject to any disclaimer, the term of this patent is extended or adjusted under 35 U.S.C. 154(b) by 13 days.

(21) Appl. No.: 16/298,031

(22) Filed: Mar. 11, 2019

(65) Prior Publication Data

US 2019/0275529 A1 Sep. 12, 2019

(30) Foreign Application Priority Data

Mar. 12, 2018 (ES) ............................ ES201830333U

(51) Int. Cl.
*B02C 25/00* (2006.01)
*B02C 21/02* (2006.01)
(Continued)

(52) U.S. Cl.
CPC ............ *B02C 21/026* (2013.01); *B02C 13/04* (2013.01); *B02C 18/142* (2013.01);
(Continued)

(58) Field of Classification Search
CPC ..... B02C 18/24; B02C 18/142; B02C 18/145; B02C 18/225; B02C 18/2291;
(Continued)

(56) References Cited

U.S. PATENT DOCUMENTS 3,335,968 A 8/1967 Young
5,431,350 A 7/1995 Purser
(Continued)

FOREIGN PATENT DOCUMENTS

JP H08131864 A 5/1996
WO WO-2011015793 A1 * 2/2011 ........... B02C 13/286
WO 2011092588 A1 8/2011

OTHER PUBLICATIONS

Spencer, D. B., Temple, J. W., Forsythe, D. M., & Bond, B. E. Large-Scale Rotary Shear Shredder Performance Testing. Journal of Energy Resources Technology, Transactions of the ASME, 107(2), See p. 289 (Year: 1985).*

*Primary Examiner* — Shelley M Self
*Assistant Examiner* — Kevin E O'Brien
(74) *Attorney, Agent, or Firm* — The Webb Law Firm

(57) ABSTRACT

A mobile shredder for metal materials comprising a feeding device, a shredding mill with a plurality of hammers associated with a rotor, and a removal device and an actuating device are provided, wherein: the feeding device comprises a hopper and a shredder with a first toothed roller and a second toothed roller that rotates in the opposite direction to that of the first roller and at a greater speed. The actuating device comprises a single motor. A control system is also provided with a plurality of hydraulic pumps for moving the rollers and a hydraulic clutch with a variable flow for moving the rotor, the plurality of hydraulic pumps and the hydraulic clutch being joined to the motor. The control system is configured to modify the rotational speed of the toothed rollers based on the motor load associated with the shredding mill; and the devices are mounted on a frame.

5 Claims, 2 Drawing Sheets

(51) Int. Cl.

| | |
|---|---|
| ***B02C 18/14*** | (2006.01) |
| ***B02C 18/22*** | (2006.01) |
| ***B02C 23/04*** | (2006.01) |
| ***B02C 23/38*** | (2006.01) |
| ***B02C 13/04*** | (2006.01) |
| ***B02C 23/10*** | (2006.01) |
| *B02C 18/16* | (2006.01) |
| *B02C 13/286* | (2006.01) |

(52) U.S. Cl.
CPC .......... *B02C 18/145* (2013.01); *B02C 18/225* (2013.01); *B02C 21/02* (2013.01); *B02C 23/04* (2013.01); *B02C 23/10* (2013.01); *B02C 23/38* (2013.01); *B02C 25/00* (2013.01); *B02C 2013/28636* (2013.01); *B02C 2018/168* (2013.01); *B02C 2201/00* (2013.01)

(58) Field of Classification Search
CPC .......... B02C 2018/147; B02C 19/0062; B02C 23/02; B02C 13/00; B02C 13/04; B02C 13/10; B02C 25/00; B02C 21/02; B02C 23/38; F05D 2260/406; F02C 7/32; F02C 7/36
USPC .................................................. 241/152.2, 73
See application file for complete search history.

(56) References Cited

U.S. PATENT DOCUMENTS 6,491,245 B1 * 12/2002 Rajewski ............ B02C 18/0007 241/223
2003/0230655 A1 * 12/2003 Giberson ................ B02C 25/00 241/101.2
2004/0112999 A1 * 6/2004 Byram .................. B02C 13/286
2013/0087644 A1 * 4/2013 Ephraim ................. A47J 42/40 241/33
2014/0203124 A1 * 7/2014 Arrieta Gonzalez ........................ B02C 21/026 241/79
2019/0275531 A1 * 9/2019 Manzanares Mercero .................. B02C 13/30

* cited by examiner

MOBILE SHREDDER FOR METAL MATERIALS WITH IMPROVED SAFETY FEATURES

CROSS-REFERENCE TO RELATED APPLICATION

This application claims priority to Spanish Utility Model Application No. U201830333 filed Mar. 12, 2018, the disclosure of which is hereby incorporated by reference in its entirety.

BACKGROUND OF THE INVENTION

Object of the Invention

The present invention relates to a mobile shredder with a prior slow shredding that improves the safety of the shredding process of metal materials, so as to prevent problems associated with the presence of flammable or explosive products among the metal materials being shredded. The mobile shredder object of the invention can be applied to the metal industry, specifically to the industry of metal recycling.

FIELD OF THE INVENTION

A shredder is a machine that processes metal material (scrap) with the objective of reducing the size thereof and increasing the density thereof. This way a material is obtained that is suitable for a series of applications in the industrial field, mainly focused on the recycling of the same.

The use of scrap metal has become an integral part of the steel industry, improving the economic viability of the sector and reducing the environmental impact. In comparison with mineral extraction, the use of recycled ferrous metals significantly reduces CO2 emissions, energy use and water consumption, as well as air pollution. At the same time, steel recycling makes more efficient use of the Earth's natural resources.

Metal recycling is an industry that is symbolically like a pyramid, with many small companies at the base which supply scrap metal to large multinational companies at the top of the pyramid. Steel recycling is done in some or all of the following steps:

- Classification: since magnets attract steel, this metal can easily be separated from other recyclable materials, such as paper, in a recycling plant.
- Shredding: Shredders incorporate rotating magnetic drums to extract iron and steel from the mixture of metal and other materials.
- Material separation: Separation is done by using electrical currents, high-pressure airflows and liquid flotation systems. It is sometimes necessary to perform other processes in certain cases.
- Shearing: Hydraulic machinery is used to exert pressure to cut steel with a large size and thickness recovered from railroads and ships. Sometimes other shearing techniques are used, such as the use of gas or plasma arc techniques.
- Packaging: Iron and steel products are compacted into large blocks in order to facilitate the handling and transportation thereof.

Steel is ideal for recycling because it does not lose any of the inherent physical properties thereof during the recycling process, which can be repeated as many times as desired. Steel is a material that is 100% recyclable and therefore recycled steel can be used for the same applications as the steel produced from virgin material.

Practically 40% of the world's steel production comes from scraps. Recycling one tonne of steel allows 1,100 kilograms of iron ore, 630 kilograms of carbon and 55 kilograms of limestone all to be saved. CO2 emissions are reduced by 58% with the use of ferrous scrap metal.

A shredder in a very basic form includes:

- An actuation system that supplies mechanical power to the shredding process, and in turn supplies the necessary hydraulic and electric power to other systems of the machine, such as the actuation of the feeding system, cooling motors, outgoing conveyor belts, etc.
- A feeding system that feeds the machine with the material to be shredded once placed in the same by other means.
- A shredding system that shreds the material and reduces it in size, which increases the density thereof. This is done by way of hammers arranged on the rotor which, while turning, strike the material in the shredding chamber until the same has a size that allows it to exit to the removal area, passing through grills with a specific span size.
- A removal system has the function of transporting the already shredded material to the exterior and carrying it to the following processes of the installation.

Currently, one of the main problems with shredders are the explosions that can occur when introducing flammable materials into the same (for example fuel tanks with traces of fuel, gas canisters, etc.), given that the shredding process is done with hammers rotating at a high peripheral speed, which strike the material against an anvil and therefore generate a large amount of sparks and heat in the process. It is when this process comes across an element or recipient that contains a trace of a flammable material that explosions of a greater or lesser degree are produced, said explosions constituting a risk for machine operators as well as for people or buildings near the same.

One way of preventing explosions is by previously shredding the material, by means of a machine designed for such purposes.

Machinery designed to perform a previous shredding has two or three rollers, such that the material placed in a hopper moves to the first roller by gravity (which rotates around 2-3 rpm) where a pushrod facilitates the contact of the material with the first roller, which traps the material and moves it towards a second roller which is faster than the first roller (8-11 rpm). The rollers rotate in opposite directions and have teeth that are interspersed with respect to the width thereof.

Thus, the material in the prior shredding is torn by the teeth of the rollers and once it is processed, it is sent to the area for the exit of the material.

Given that this process is done at a slow speed, it does not cause explosions and, furthermore, prepares the material for the subsequent shredding thereof, eliminating the situations in which explosions may occur.

These machines are designed to work separately, and as such the power designed for each one of them must be suitable to carry out a specific production. When these machines work in line, meaning first the prior shredding and then the shredding, the percentage of time in which the two machines will be working at full load is reduced to a minimum. This is due to the fact that regulating the feeding of the shredder is done based on the load of the motor which actuates the same, and when this motor is at a pre-established load, the feeding is reduced and even stops, depending on the parameters of design and control, and as such the slow shredding will not need to work at full load. This is the result of overdimensioned motors in design when the two machines work in line.

SUMMARY OF THE INVENTION

With the aim of achieving the objectives and avoiding the drawbacks that were mentioned in the preceding sections, the invention proposes a mobile metal shredder that offers improved safety conditions in the operation thereof with respect to mobile metal shredders known in the state of the art.

The mobile metal shredder object of the invention comprises a feeding device in which the slow shredding process is included, configured to receive material to be shredded, a shredding mill to shred the material received through the feeding device by means of a plurality of hammers associated with a rotor, a removal device configured to remove the shredded material and an actuating device configured to provide energy to the feeding device, the shredding mill and the removal device.

In the mobile metal shredder object of the invention the feeding device comprises a hopper and a shredder, the shredder comprising a first toothed roller and a second toothed roller that rotates in the opposite direction to that of the first toothed roller and at a greater speed.

The actuating device of the mobile metal shredder object of the invention comprises a single motor, which provides power to the feeding device, the shredding mill and the removal device.

The mobile metal shredder object of the invention comprises a control system which comprises a plurality of hydraulic pumps and a hydraulic clutch with variable flow, the plurality of hydraulic pumps and the hydraulic clutch with variable flow being joined to the motor.

In the mobile metal shredder object of the invention, the plurality of hydraulic pumps controls the movement of the toothed rollers and the hydraulic clutch with variable flow controls the movement of the rotor.

The control system of the mobile metal shredder object of the invention is configured to modify the rotational speed of the first toothed roller and of the second toothed roller based on the motor load associated with the shredding mill.

In the shredder object of the invention the feeding device, the shredding mill, the removal device and the actuating device are mounted on a frame.

In the mobile shredder with improved safety features object of the invention, teeth of the first toothed roller are interspersed between teeth of the second toothed roller.

The mobile shredder with improved safety features object of the invention comprises a series of pulleys and belts joined to the motor by means of the hydraulic clutch with variable flow, said series of pulleys and belts being joined to the rotor of the shredding mill.

The mobile shredder with improved safety features object of the invention comprises a series of measuring systems for controlling a workload of the motor.

The measuring systems for controlling a workload of the motor of the mobile shredder with improved safety features object of the invention are:

- Pressure transducers in order to know the working pressures in the shafts of the rollers of the shredder;
- Speed sensors in order to know the speed of the rollers of the shredder;
- Different sensors in order to know the speed of the rollers of the shredder
- A control unit of the motor to know the speed of the motor and the torque of the motor to determine the power delivered by the motor; and
- A speed sensor of the rotor.

The mobile shredder with improved safety features object of the invention comprises a series of systems for regulating the operation of the shredder.

The systems for regulating the operation of the shredder are:

- Pumps with variable flow for powering the rollers of the shredder.
- A system for reversing the rotation of the rollers if necessary
- A system for modifying the speed of the combustion motor; and
- An all or nothing supply system for the hydraulic circuit of the hydraulic clutch with variable flow for transmitting a greater or lesser degree of torque to the rotor of the shredding mill.

BRIEF DESCRIPTION OF THE DRAWINGS

For the purpose of helping to make this specification more readily understandable, a set of drawings constituting an integral part of the same has been included below, wherein by way of illustration and not limitation represent the following.

Figure 1:
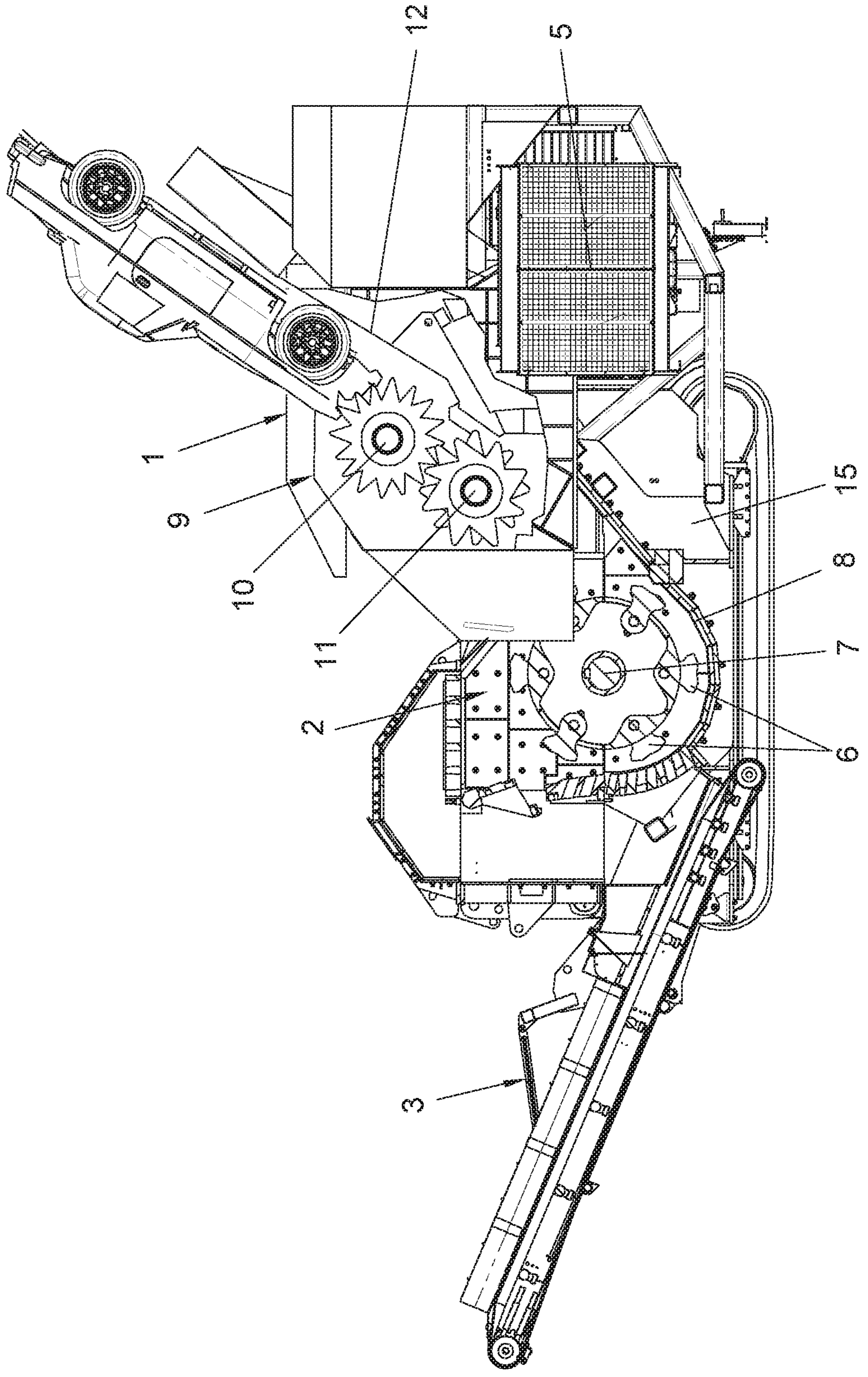
FIG. 1 shows a cross-sectional side view of the mobile metal shredder object of the invention.
Figure 2:
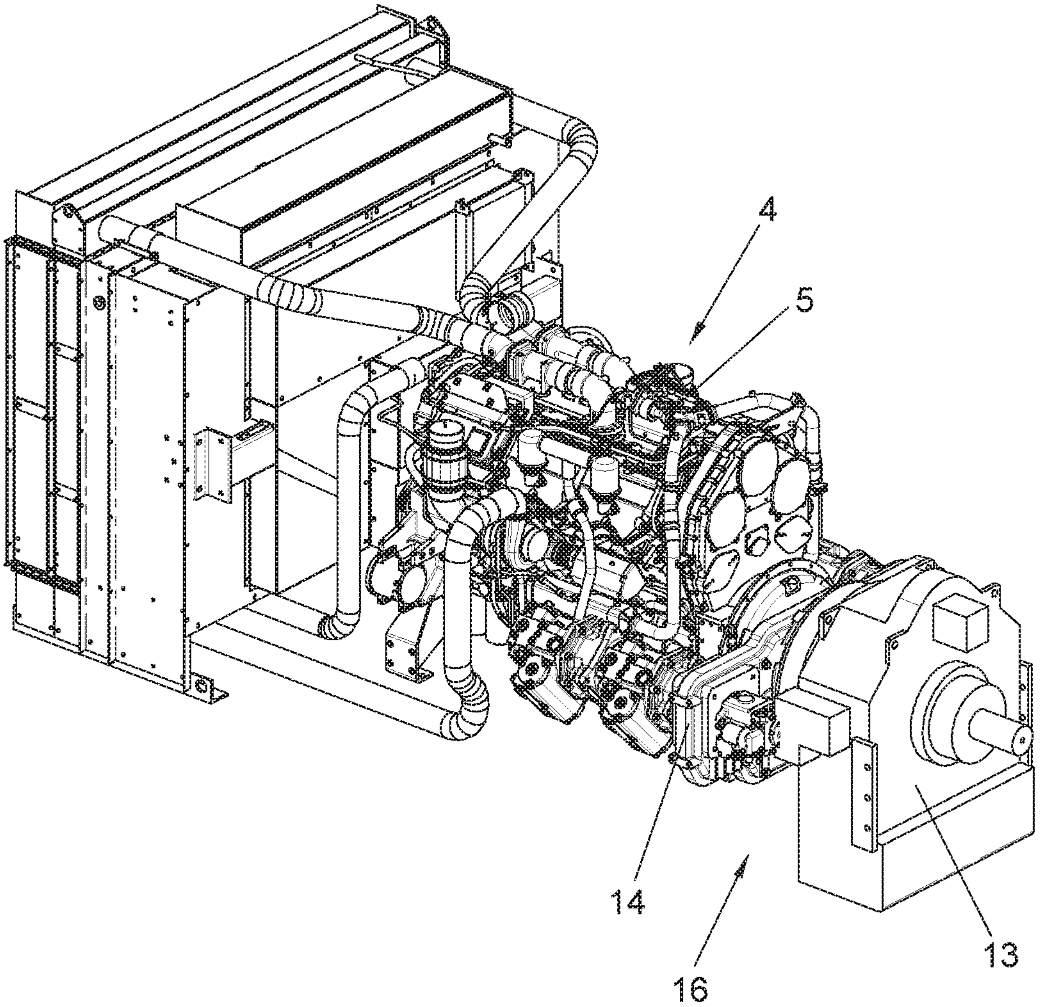
FIG. 2 shows a perspective view of the actuating device with the motor, the hydraulic pumps and the hydraulic clutch with a variable flow of the mobile metal shredder object of the invention.

The various numerical references found in the figures correspond to the following elements:

1. Feeding device;
2. Shredding mill;
3. Removal device;
4. Actuating device;
5. Motor;
6. Hammers;
7. Rotor;
8. Shredding chamber;
9. Shredder;
10. First toothed roller;
11. Second toothed roller;
12. Hopper;
13. Hydraulic clutch with variable flow;
14. Hydraulic pumps;
15. Frame; and
16. Control systems.

DESCRIPTION OF THE INVENTION

Considering the numbering used in the figures, the mobile metal shredder object of the disclosure comprises a feeding device (1) that receives the material to be shredded and moves it towards a shredding mill (2) where the shredding of the material received through the feeding device (1) is carried out, and then to a removal device (3) for removing the material that has now been shredded by the shredding mill.

Furthermore, the mobile metal shredder object of the disclosure comprises an actuating device (4) that comprises a single motor (5) which provides the necessary power for all of the components of the shredder to function properly, in other words, the motor (5) provides energy to the feeding device (1), to the shredding mill (2) and to the removal device (3).

The shredding mill (2) in the preferred embodiment of the disclosure comprises a plurality of hammers (6) associated with a rotor (7) inside the shredding chamber (8) such that the impact against the metal material causes the shredding of the metal material.

The feeding device (1) of the mobile metal shredder object of the disclosure incorporates a hopper (12) in which the material to be shredded is placed, and a shredder (9), which performs a first shredding of the metal material at a low speed, so that when the metal material reaches the shredding mill (2), where hammers (6) associated with the rotor (7) rotate at a very high speed and produce sparks and heat inside the shredding chamber (8), possible traces of flammable materials present in the material to be shredded are prevented from producing explosions, which are dangerous for the operation of the shredder.

In the preferred embodiment of the disclosure of the mobile metal shredder, the shredder (9) comprises a first toothed roller (10) and a second toothed roller (11) that rotates in the opposite direction to that of the first toothed roller (10). The first toothed roller (10) in the preferred embodiment of the disclosure rotates at a slow speed (approximately 2-3 r/min) while the second toothed roller (11) rotates at a greater speed than the speed of the first toothed roller (10), at approximately 8-11 r/min).

The toothed rollers (10, 11) have teeth interspersed throughout the width of the same, such that the material to be shredded is trapped by the teeth of the two toothed rollers (10, 11) and once it is shredded, it is then moved to the shredding mill (2).

The feeding of the shredding mill (2) is regulated by regulating the rotational speed of the toothed rollers (10, 11) of the shredder (9), since the shredding mill is fed (2) from the production of the shredder (9).

The mobile metal shredder object of the disclosure moves the rotor (7) of the shredding mill (2) with a series of pulleys and belts joined to the motor (5) with the interposition of a hydraulic clutch with variable flow (13), while the two toothed rollers (10, 11) of the shredder (9) are associated with a plurality of hydraulic pumps (14) that can make them rotate at a higher or lower speed.

The plurality of hydraulic pumps (14) and the hydraulic clutch with variable flow (13) that are joined to the motor (5) make up a control system (16) which ensures maximum efficiency of the single motor (5) of the mobile shredder object of the disclosure.

The operation of the control system (16) is simple, given that, assuming a state of equilibrium between the shredder (9) and the shredding mill (2), the hydraulic pumps (14) which move the toothed rollers (10, 11) of the shredder (9) operate a full capacity, feeding the shredding mill (2) with an amount of the product that the shredding mill (2) is capable of shredding. Now, at the moment when material that has come out of the shredder (9) accumulates in the shredding mill (2), the rotor (7) of the shredding mill (2) will require additional power from the motor (5), and this additional power comes from reducing the output of the hydraulic pumps (14) that move the toothed rollers (10, 11) of the shredder (9), and as such, an automatic regulation of the material that comes out of the shredder (9) and which has to be absorbed by the shredding mill (2) is carried out.

The mobile metal shredder object of the disclosure further has a plurality of measuring systems for controlling the workload of the motor (5) and of the hydraulic pumps (14) of the shredder (9).

The measuring systems that are incorporated in the shredder are:

- Pressure transducers, in order to know the working pressures in the shafts of the rollers (10, 11) of the shredder (9).
- Speed sensors in order to know the speed of the rollers (10, 11) of the shredder (9) or flow meters for the same purpose.
- A control unit of the motor that measures the speed of the motor (5), which is the same as the input speed of the hydraulic clutch of variable flow (13), and the torque of the motor; with this datum and the datum of the speed of the motor, the power delivered by the motor (5) is determined.
- Speed sensor of the rotor (7).
- Temperature sensor for the oil of the hydraulic circuit of the clutch with variable flow.
- The datum of the speed of the rollers (10, 11) of the shredder (9), along with the datum of the pressure transducers, allows the motor power (5) sent to the part of the shredder (9) to be known.

Furthermore, mobile metal shredder object of the disclosure has a series of systems for regulating the operation of the shredder. These systems for regulating the operation of the shredder are:

- A system for modifying the flow of the hydraulic pumps (14) which power the toothed rollers (10, 11) of the shredder (9).
- A system for modifying the speed of the motor (5).
- An all or nothing supply system for the hydraulic circuit of the hydraulic clutch with variable flow (13) such that it transmits a greater or lesser degree of torque to the rotor (7) of the shredding mill (2).

By modifying the flow of the hydraulic pumps (14) which power the toothed rollers (10, 11), the speed of the toothed rollers (10, 11) themselves is modified and the power sent the shredder (9) is modified as well. The pressure of the hydraulic pumps (14) is limited to a maximum value.

The all or nothing supply system for the hydraulic circuit of the hydraulic clutch with variable flow (13) is used to prevent overloading of the motor (5) of the mobile metal shredder object of the disclosure.

With these systems for controlling and regulating the operation, it is known at all times what percentage of the motor (5) power is being sent to each part of the shredder itself, in other words to the shredder (9) or to the shredding mill (2).

This way, if it is detected that the motor (5) is operating above the pre-established values and it is in the part of the shredding mill (2), more power can be sent to the shredding mill (2), reducing the flow of the hydraulic pumps (14) of the shredder, thereby regulating the feeding (9) and vice versa.

All of the components of the mobile metal shredder object of the disclosure are incorporated on a frame (15), said frame (15) in turn resting on the ground by means of a drive system, which in the preferred embodiment of the disclosure are caterpillar tracks but could also be a plurality of wheels or any other means that make the shredder object of the disclosure mobile.

The present disclosure is not intended to be limited to the embodiments described herein. Those skilled in the art may develop other embodiments in light of the description made herein. As such, the scope of the disclosure is defined by the following claims.

The invention claimed is:

1. A metal material mobile shredder with improved safety features comprising a feeding device configured to receive a material to be shredded and shred it, a shredding mill configured to shred the material received by the feeding device by an arrangement of a plurality of hammers and a rotor, a removal device configured to remove a shredded material and an actuating device configured to provide energy to the feeding device, the shredding mill and the removal device, and the feeding device comprises a hopper and a shredder, the shredder comprising a first toothed roller and a second toothed roller that rotates in the opposite direction to that of the first toothed roller and at a greater speed; and the feeding device, the shredding mill, the removal device and the actuating device are mounted on a frame, wherein:

the actuating device comprises a single motor; and the mobile shredder further comprises a control system which comprises a plurality of hydraulic pumps configured to move the toothed rollers, and a hydraulic clutch with variable flow configured to move the rotor, the plurality of hydraulic pumps and the hydraulic clutch with variable flow being joined to the motor, said control system being configured to modify the rotational speed of the first toothed roller and/or the second toothed roller based on a motor load associated with the shredding mill.

2. The mobile shredder with improved safety features, according to claim 1, wherein at least one tooth of the first toothed roller is interspersed between at least two teeth of the second toothed roller.

3. The mobile shredder with improved safety features according to claim 1, further comprising a plurality of pulleys and belts joined to the motor and rotor of the shredding mill by means of the hydraulic clutch with variable flow.

4. The mobile shredder with improved safety features, according to claim 1, further comprising:

at least one pressure transducer configured to detect the working pressures in the shafts of the first and second toothed roller of the shredder;

at least one speed sensor or at least one flow meter configured to detect the speed of the first and second toothed rollers of the shredder;

a control unit of the motor configured to detect a speed of the motor and a torque of the motor to determine the power delivered by the motor;

a rotor speed sensor; and a temperature sensor of a hydraulic circuit of the hydraulic clutch with variable flow, wherein the at least one pressure transducer, the at least one speed sensor or the at least one flow meter, the control unit, the rotor speed sensor, and the temperature sensor are configured to control a workload of the motor.

5. The mobile shredder with improved safety features, according to claim 1, further comprising a plurality of systems configured to regulate the operation of the shredder, the plurality of systems comprising:

a first system configured to modify the flow of the plurality of hydraulic pumps which power the toothed rollers of the shredder;

a second system configured to modify a speed of the motor; and a supply system for the hydraulic circuit of the hydraulic clutch with variable flow the hydraulic clutch with variable flow configured to transmit a greater or lesser degree of torque to the rotor of the shredding mill as a result of the flow supply in the hydraulic clutch.

* * * * *